B. S. Hill.
Die for Cutting Male-Screw Threads.
Nº 47,543.                     Patented May 2, 1865.
Fig: 1
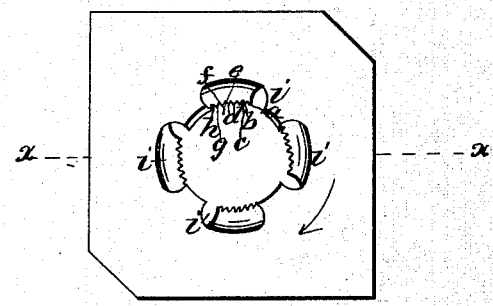
Fig: 2.
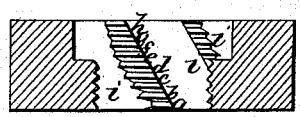
Witnesses:
J W Coombs
G W Reed
Inventor;
Benj. S. Hill
per Brown Coombs & Co
Attorneys

UNITED STATES PATENT OFFICE.

BENJAMIN S. HILL, OF NEW YORK, N. Y.

IMPROVEMENT IN DIES FOR CUTTING SCREW-THREADS.

Specification forming part of Letters Patent No. 47,543, dated May 2, 1865.

*To all whom it may concern:*

Be it known, that I, BENJAMIN S. HILL, of the city, county, and State of New York, have invented a new and useful Improvement in Dies and Chasers for Cutting Screw-Threads; and I do hereby declare that the following is a full, clear, and exact description of the same, reference being had to the accompanying drawings, forming part of this specification, in which—

Figure 1 is a plan view of a die constructed according to my invention. Fig. 2 is an axial section of the same in the plane indicated by the line $x\ x$ in Fig. 1.

Similar letters of reference indicate corresponding parts in both figures.

This invention consists in the arrangement of the chasing or cutting points of a die or chaser for cutting male screw-threads in a line or lines diagonally across the cutting faces or edges, or spiral to the axis, so that but one point is cutting at one and the same time in any line parallel with the length of the bolt, pipe, or other article, upon the exterior of which the thread is to be cut, thereby rendering the cutting-points less liable to split or tear the bolt, pipe, or other article in the cutting operation and enabling the cutting to be performed more easily.

The invention is applicable to all dies or chasers for cutting male screw-threads, whether composed of one or several pieces. I have, however, only represented by drawings its application to a solid die, as that fully illustrates the improvement.

The invention is best illustrated in Fig. 2, in which the diagonal or spiral arrangement of the cutting-points $a\ b\ c\ d\ e\ f\ g\ h$ is clearly shown. This arrangement of the points is obtained by simply cutting the clearance-grooves $i\ i$ obliquely across the edges of the thread.

The number of clearance-grooves and the degree of their obliquity should preferably be such that the cutting-points should operate at equal distances around the pipe, bolt, or other articles to be cut.

It will be understood by reference to the two figures and the arrow marked on Fig. 1 that when the die turns in the direction of the arrow the lower one, $a$, of each line of cutting-points will cut on one line parallel with the axis of the bolt, pipe, or other article, the second one, $b$, in another line, and the third one, $c$, in another, and so on through the whole line of points.

What I claim as my invention, and desire to secure by Letters Patent, is—

The arrangement of the chasing or cutting points of a die or chaser for cutting male screw-threads in a line or lines diagonally across the cutting faces or edges, or spiral to the axis, substantially as and for the purpose herein set forth.

B. S. HILL.

Witnesses:
J. W. COOMBS,
G. W. REED.